(12) United States Patent
Risolia

(10) Patent No.: US 6,830,160 B2
(45) Date of Patent: Dec. 14, 2004

(54) MULTI-MEDIA VENDING MACHINE WITH DIGITAL DOCKING STATION

(76) Inventor: Joseph Robert Risolia, Suite 202, 4100 NE. 2nd Ave., Miami, FL (US) 33137

( * ) Notice: Subject to any disclaimer, the term of this patent is extended or adjusted under 35 U.S.C. 154(b) by 109 days.

(21) Appl. No.: 10/242,641

(22) Filed: Sep. 12, 2002

(65) Prior Publication Data

US 2003/0057219 A1 Mar. 27, 2003

Related U.S. Application Data

(60) Provisional application No. 60/318,416, filed on Sep. 12, 2001.

(51) Int. Cl.[7] .............................................. G07F 11/00
(52) U.S. Cl. ............................................ 221/3; 705/14
(58) Field of Search ............................ 221/3, 7, 9, 13, 221/92; 705/14, 86, 87, 26

(56) References Cited

U.S. PATENT DOCUMENTS

| | | | | |
|---|---|---|---|---|
| 5,415,319 A | * | 5/1995 | Risolia | ........................... 221/3 |
| 2003/0040962 A1 | * | 2/2003 | Lewis | .......................... 705/14 |

* cited by examiner

Primary Examiner—Kenneth Noland
(74) Attorney, Agent, or Firm—Robert M. Downey, PA

(57) ABSTRACT

A multi-media vending machine is provided with a multi-media computer, a video monitor, audio speakers, controls and visual displays. A currency accepter, coin handler and magnetic stripe card reader are provided for accepting payment using paper currency, coin currency, a credit card or a debit card. Music compositions and other multi-media products are stored in the multi-media computer. Additionally, one or more multi-media players are provided for playing a variety of media such as CD, DVD and CD ROM, to allow presentation of music, full motion video or software such as games, entertainment, productivity or other software titles. A hardware docking port allows a user to connect a digital media player and select video, software or music tracks to be purchased and downloaded to the user's portable digital media player. A user control panel allows the user to sample tracks of the product selected, and to adjust the parameters of audio and video during sampling. A modem connects the multi-media computer to a public telephone network to enable the vending machine owner to remotely interrogate the vending machine to determine stock levels, daily activity journals, cash box contents, as well as to remotely upload or download multi-media products, including music, video and software.

20 Claims, 2 Drawing Sheets

SYSTEM BLOCK DIAGRAM

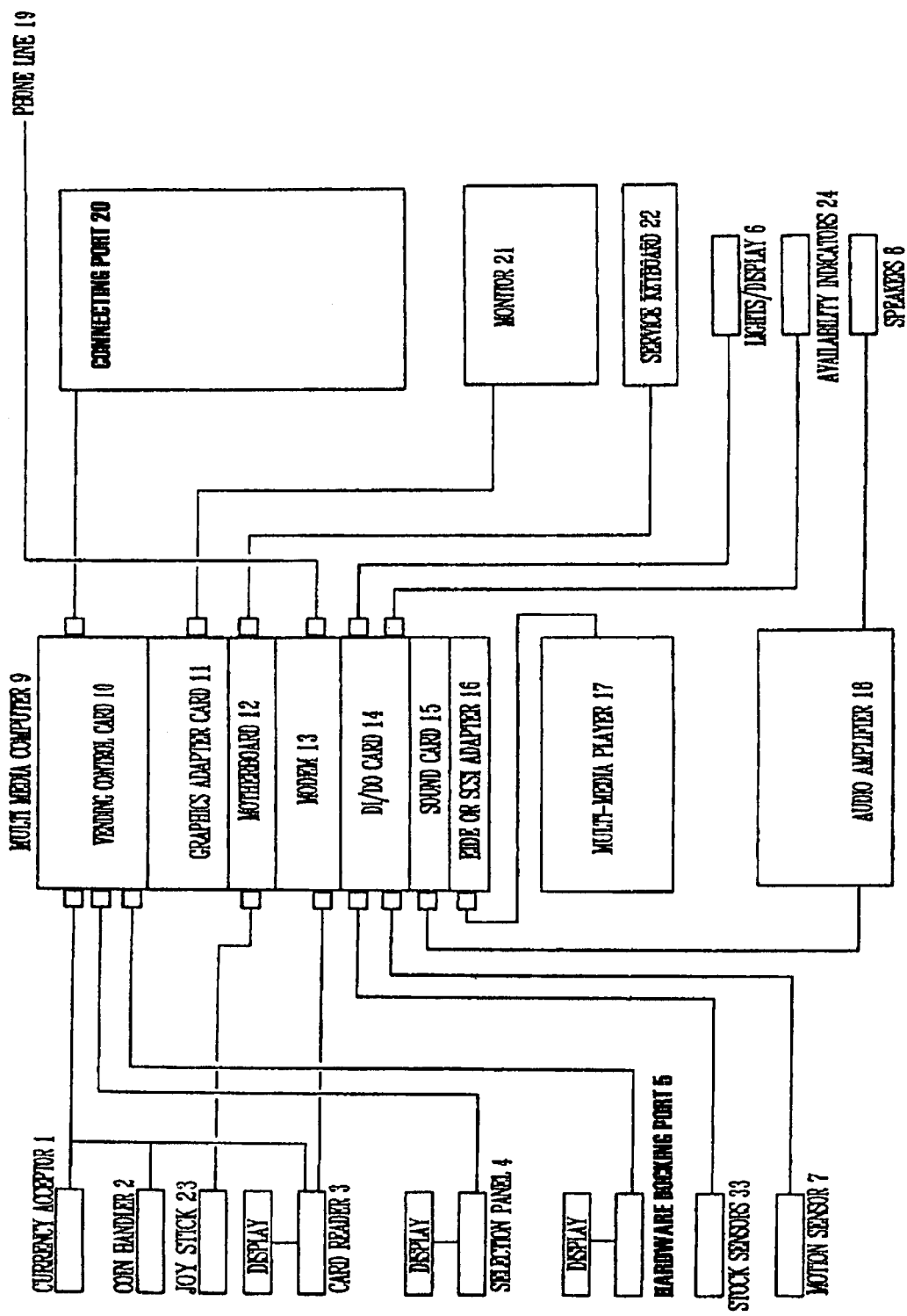
FIG. 1 – SYSTEM BLOCK DIAGRAM

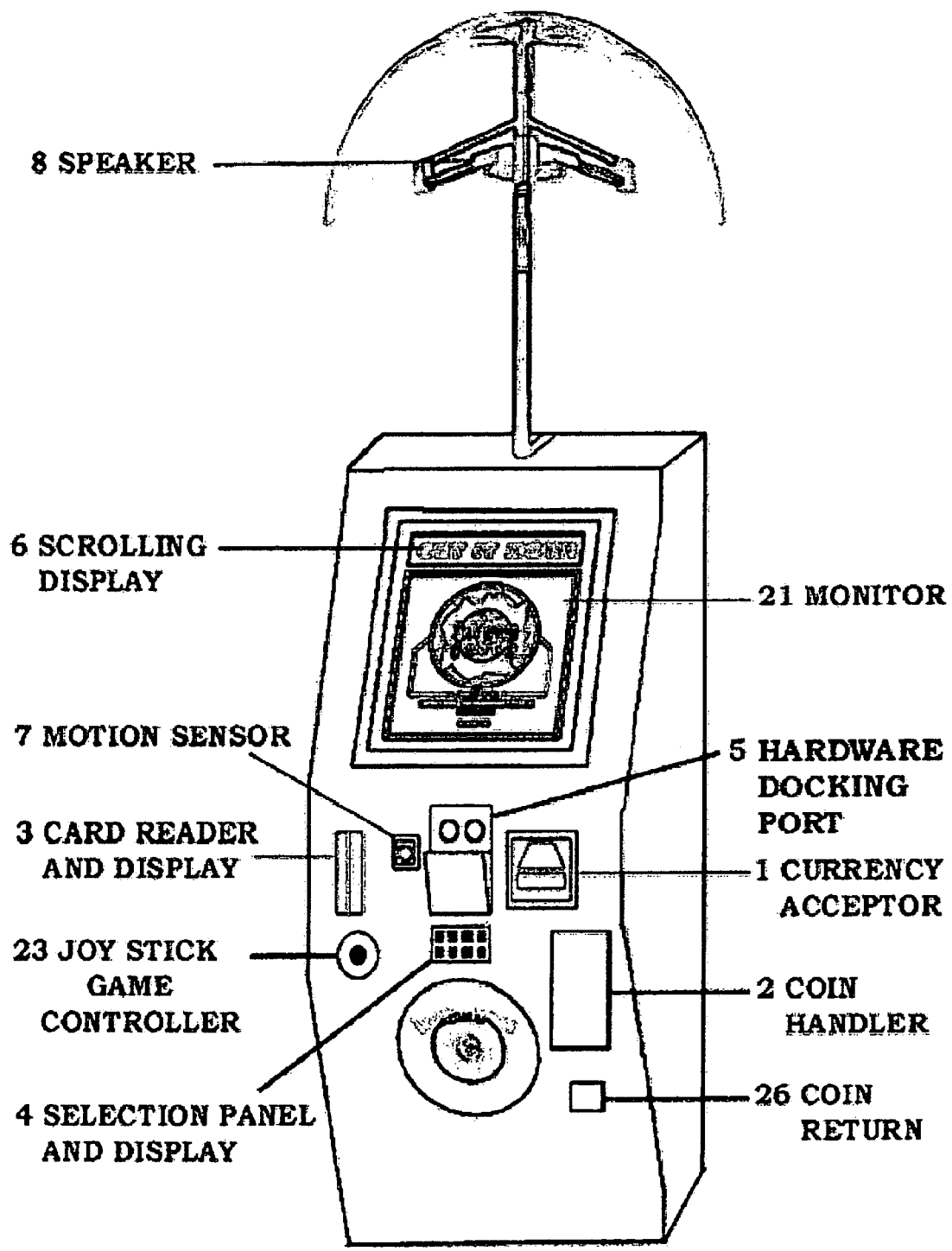
FIG. 2 - FRONT VIEW GENERAL LAYOUT

MULTI-MEDIA VENDING MACHINE WITH DIGITAL DOCKING STATION

This application claims the benefit of provisional application No. 60/318,416, filed Sep. 12, 2001.

BACKGROUND OF THE INVENTION

1. Field of the Invention

The present invention is directed to a multi-media vending machine, and more particularly, to a vending machine including a multi-media computer and a hardware docking port to allow a customer to connect a portable digital media player to the vending machine for purchasing and downloading multi-media products to the user's portable digital media player.

2. Discussion of the Related Art

Machines for vending various products, including snacks, soft drinks, cigarettes and recorded music on cassette tape and CD are well known. Further, the ability to sample a product prior to purchasing from a vending machine is disclosed in my prior U.S. Pat. No. 5,415,319. In recent years, digital media has become commonplace and is considered the present state-of-the-art for recording music, full motion video and software. The advanced development of relatively inexpensive portable digital media player devices which have the capability of storing and/or recording extensive audio and/or video tracks has led to a substantial increase in the demand for digital media products.

In view of the emerging demand for digital media products, there remains a need for a multi-media vending machine which is adapted to store an extensive selection of multi-media products and which is further adapted to download one or more select multi-media products, including music, full motion video and software (e.g. games, entertainment and productivity software), to a purchaser's portable digital media player. More specifically, there is a need for a multi-media vending machine which enables a purchaser to plug a portable digital media player into a vending machine and to subsequently select, purchase and download digital multi-media products for storage and playback on the purchaser's portable digital media player.

SUMMARY OF THE INVENTION

The present invention is directed to a multi-media vending machine which includes a multi-media computer, a video monitor, audio speakers, controls, visual displays and means for accepting payment. The payment acceptance means preferably includes a currency accepter, a coin handler and a magnetic stripe card reader, thereby allowing a purchaser to buy one or more select multi-media products with use of paper currency, coin currency, a credit card or a debit card. The multi-media computer in the vending machine is adapted to store a vast selection of music compositions and other multi-media products. Additionally, one or more multi-media players may be installed in the vending machine for playing a variety of media including music and/or video on CD, DVD and CD ROM, thereby allowing presentation of music, full motion video or software such as games, entertainment, productivity or other software titles. The multi-media vending machine is further provided with a hardware docking port to enable a purchaser to connect a portable digital media player to the multi-media computer of the vending machine. Once connected via the hardware docking port, the purchaser can select video, software or music tracks to be purchased and downloaded to the purchaser's portable digital media player. A user control panel allows the purchaser to sample tracks of the product selected, and to adjust the parameters of audio and video during sampling. A modem connects the multi-media computer to a public telephone network, thereby enabling the vending machine owner to remotely interrogate the vending machine from a central control facility in order to determine stock levels, daily activity journals, cash box contents, as well as to remotely upload or download different multi-media products, including music, video and software.

BRIEF DESCRIPTION OF THE DRAWINGS

For a fuller understanding of the nature of the present invention, reference should be made to the following detailed description taken in conjunction with the accompanying drawings in which:

FIG. 1 is a system block diagram illustrating the principal components of the multi-media vending machine of the present invention; and FIG. 2 is a front perspective view of the multi-media vending machine of the present invention, in accordance with a preferred embodiment thereof.

Like reference numerals refer to like parts throughout the several views of the drawings.

DETAILED DESCRIPTION OF THE PREFERRED EMBODIMENTS

Referring to the drawings, and initially FIG. 1, a basic system block diagram is shown illustrating the principal components of the multi-media vending machine with digital docking station of the present invention. As seen in FIG. 1, the heart of the system is a multi-media computer 9 which provides control for the numerous components of the machine. The multi-media computer 9 preferably utilizes an MMX compatible processor CPU and adequate RAM to support the application in the system of the present invention. The multi-media computer 9 is populated with a sound card 15, and EIDE or SCSI adaptor 16, a Digital Input/Digital Output (DI/DO) card 14, a modem card 13, a graphics adaptor card 11, and a custom card, referred to as a vending control card 10. Depending on the particular computer utilized, some of the functions described as cards may be incorporated in the computer motherboard 12. Nevertheless, the function of each component remains the same, as described herein.

The multi-media vending machine of the present invention is provided with means for accepting payment. The payment accepting means includes both means for accepting currency as well as credit card or debit card payment. Specifically, a paper currency acceptor 1 accepts and identifies paper currency in denominations selected by the vending machine operator and presents the currency data to the vending control card 10 installed in the multi-media computer 9 via a bi-directional bus. A coin handler 2 accepts, identifies and dispenses coin currency. The coin handler also communicates with the vending control card 10 via the bi-directional multi-drop bus. Additionally, a magnetic stripe card reader 3 is provided for reading, decoding and identifying a variety of cards, such as credit cards and debit cards. The card reader 3 output is also supported by the vending control card 10 via the bi-directional bus. Data output is applied to the modem card 13 for telephone line confirmation via the card service agency. Upon approval of the service agency, the vending control card 10 allows the customer to proceed with the purchase under the overall control of the multi-media computer 9. The vending machine of the present invention accepts payment, according to the methods described above, for the purchase of multi-media products which are downloaded, through a hardware docking port 5, to a purchaser's portable digital media player, as described more fully hereinafter. The vending machine may also accept payment to allow a potential purchaser to sample one or more multi-media products prior to purchase.

Referring to FIGS. 1 and 2, a selection panel 4 contains switches and a display to allow the user (customer) to enter the alphanumeric identification of the product desired with promptly by the display. The selection panel 4 applies data to, and receives data from, the multi-media computer 9 via the vending control card 10 which resides on the multi-media computer bus.

As described above, the multi-media vending machine includes a hardware docking port. In a preferred embodiment, the hardware docking port 5 contains a USB port, an infrared port, controls and a display to allow the user to connect a portable digital media player to the multi-media computer 9. This allows the user to select one or more multi-media products, including video, software and/or music tracks and, once purchased, to be downloaded to the user's portable digital media player. A user control panel on the hardware docking port 5 allows the user to sample tracks of the product selected, and adjust the parameters of video and audio during sampling. The hardware docking port 5 applies and receives data from the multi-media computer 9 bus via the vending control card 10 on its own serial port.

Display means 6, such as lights or a scrolling visual display are provided on the front of the multi-media vending machine. The display means 6 includes a series of contact closures controlled by the multi-media computer 9 through the Digital Input/Digital Output (DI/DO) card 14. This allows the activation of lighting and/or displays on the vending machine which can be customized for individual locations and products.

Motion sensor means 7 includes a passive infrared (IR) motion detector which is structured to sense movement within a controlled field pattern surrounding the multi-media vending machine. When movement is detected, the motion sensor means is active, and an input signal is applied to the DI/DO card 14. This signal can then be utilized under control of the multi-media computer 9 to activate the multi-media player 17 and the display means 6 to attract potential customers passing through the controlled field pattern.

Speaker means 8 are provided for playing audio components of the multimedia products to potential customers. The speaker means 8 may consist of conventional panel mounted speakers or, alternatively, one or more directional speakers. For instance, directional speakers may be mounted in a quasi-parabolic enclosure at the top of the vending machine, as shown in FIG. 2. The user is provided with means for controlling the volume level of the speaker output. A speaker port is located on the back of the vending machine to connect to an external speaker system for in-store listening. The sound level is controlled internally for instore play.

The vending control card 10 resides on the multi-media computer 9 bus and provides the necessary communications and control between the multi-media computer 9 and the input/output devices, including the currency acceptor 1, the coin handler 2, the card reader 3, the selection panel 4, the user controls of the hardware docking port 5 and the additional connecting port 20. The vending control card allows a flexible presentation and vending scheme via the software control allowed by the utilization of the multi-media computer 9.

As described above, the multi-media computer 9 includes a plurality of functional components. Specifically, a graphics adapter card 11 is provided to allow full motion video originating from the multi-media player 17 to be presented on a high-resolution monitor 21. The motherboard 12 of the multi-media computer 9 contains the processor, memory, storage devices, software and input/output controls as well as the address/data bus required to support the cards and input/output devices. A modem card provides access to the public telephone network for connecting the system of the vending machine to a remote central control facility. This allows the system to report status and emergency situations. The modem connection also allows the vending machine owner or vendor to interrogate the system for stock levels, daily activity journals, and cash box contents. Further, the modem connection allows the machine owner or vendor to upload or download new multi-media products, including music compositions, to the database play list, as well as allowing software updates and power on resets from the remote central control facility. The modem card 13 also allows pass-thru for the card reader 3 and provides auto dialing if desired to report tampering or other abnormal conditions.

The digital input/output (DI/DO) card 14 provides a plurality of contact sense input points and contact operate output points. This allows activity of contact sense inputs, both of the normally open type employed in the motion sensor 7 or the normally closed type, as used in the tamper switch circuitry, to be detected by the multi-media computer 9.

A standard sound card 15 resides on the multi-media computer 9 bus and processes the audio portions of the materials from the multi-media player 17 and provides the input signals to the audio amplifier 18. An EIDE or SCSI bus card provides the necessary interface between the multi-media computer 9 and the multi-media player 17, or a plurality of multi-media players 17. The preferred scheme is the utilization of the SCSI card and its associated bus to interface the multi-media player 17 or plurality of multi-media players, and to utilize the internal motherboard 12 EIDE interface to operate the internal hard drive and/or CD ROM drive and floppy drive for system support.

As described above, the system of the multi-media vending machine preferably includes one or more multi-media players 17. The one or plurality of multi-media players 17 are connected to the multi-media computer 9 via the EIDE or SCSI bus card 16 so as to allow the playing of a variety of media such as, but not limited to, CD, DVD or CD ROM, thereby allowing the presentation of music, full motion video or software including games, entertainment, productivity or other software titles.

The audio amplifier 18 accepts the output from the sound card 15, amplifies the signals, and matches the impedance of the speakers 8 and the optional headphones, if installed. The audio amplifier 18 contains a master volume control to limit sound pressure level output, thereby assuring that the user volume level does not exceed OSHA limits, even when the user volume is set at maximum level.

A standard phone line and modular connector 19 allows the subject system to access the public telephone network for both generating calls from the modem 13 to preprogrammed numbers and for receiving calls to the modem 13 in order to check system status, to add or delete musical compositions or other media to or from the database, to copy journals and perform other electronic housekeeping from the remote central control facility. A connecting port 20 allows for the addition of additional digital media docking stations, thereby accommodating multiple customers.

A high-resolution monitor 21, such as a multi-sync computer display, is provided on the front of the multi-media vending machine, as seen in FIG. 2. Options are provided to drive remote monitors, LCD displays or to convert the output to base band video or NTSC standards by the simple replacement of the graphics adapter card 11.

An internal service keyboard 22 is secured to the inside of the vending machine housing to allow service personnel to run diagnostics and other service functions. The internal service keyboard 22 also allows service personnel to install software changes or upgrades when used in conjunction with the multi-media computer 9, internal floppy or CD ROM drives.

A joystick or other game controller device 23 may be provided for demonstration and evaluation of various interactive software products. The joystick or other controller device 23 is supported by the game controller port on the motherboard 12 of the multi-media computer 9. The system can be set up and programmed to require a potential customer to pay a fee prior to testing, sampling or evaluating interactive software products, thereby preventing abuse by non customers and maintaining availability for sincere potential customers.

While the present invention has been shown and described in accordance with a practical and preferred embodiment thereof, it is recognized that the departures from the instant disclosure are contemplated within the spirit and scope of the present invention as defined in the following claims under the doctrine of equivalents.

What is claimed is:

1. A vending machine comprising:
   a multi-media computer;
   means for accepting payment, including:
      a paper currency acceptor and a coin handler for accepting payment and structured for identifying accepting paper currency and accepted coin currency, and further structured to dispense coin currency as change from excess payment received; and
      a magnetic stripe card reader for reading, decoding and identifying data stored on the magnetic stripe of a purchase card;
   means for storing a plurality of multi-media products;
   means for accessing multi-media products stored on a remote computer database;
   means for sampling said one or more of said plurality of multi-media products prior to purchase;
   means for selecting one or more of said plurality of multi-media products for purchase;
   means for connecting a portable digital media player device to said vending machine; and
   means for downloading said selected one or more of said plurality of multi-media products to the portable digital media player device.

2. The vending machine as recited in claim 1 wherein the purchase card is a credit card.

3. The vending machine as recited in claim 1 wherein the purchase card is a debit card.

4. The vending machine as recited in claim 1 wherein said means for storing a plurality of multi-media products includes said multi-media computer.

5. The vending machine as recited in claim 1 wherein said means for storing a plurality of multi-media products includes at least one multi-media player device.

6. The vending machine as recited in claim 5 wherein said at least one multi-media player device is a CD player.

7. The vending machine as recited in claim 5 wherein said at least one multi-media player device is a DVD player.

8. The vending machine as recited in claim 5 wherein said at least one multi-media player device is a CD ROM drive.

9. The vending machine as recited in claim 5 wherein said plurality of multi-media products include musical recordings, full motion video and audio recordings, and software.

10. The vending machine as recited in claim 1 wherein said means for connecting a portable digital media player device to said vending machine comprises a hardware docking port.

11. The vending machine as recited in claim 10 wherein said hardware docking port is a USB port.

12. The vending machine as recited in claim 10 wherein said hardware docking port is an infrared port.

13. The vending machine as recited in claim 1 wherein said means for sampling includes one or more audio speakers.

14. The vending machine as recited in claim 1 wherein said means for sampling comprises at least one video monitor.

15. The vending machine as recited in claim 1 wherein said means for sampling further comprises control means for selecting samples of at least some of said stored plurality of multi-media products.

16. A vending machine comprising:
   a multi-media computer;
   means for storing a plurality of multi-media products;
   means for sampling said one or more of said plurality of multi-media products prior to purchase;
   said means for sampling including at least one audio speaker and at least one video monitor;
   means for selecting one or more of said plurality of multi-media products for purchase;
   means for connecting a portable digital media player device to said vending machine; and
   means for downloading said selected one or more of said plurality of multi-media products to the portable digital media player device.

17. The vending machine as recited in claim 16 wherein said means for accepting payment includes a paper currency acceptor and a coin handler, and said means for accepting payment being structured and disposed to accept paper currency and coin currency, and said means for accepting payment being further structured and disposed for identifying the accepted paper currency and coin currency and to dispense coin currency as change from excess payment received.

18. The vending machine as recited in claim 16 wherein said means for accepting payment includes a magnetic stripe card reader for reading, decoding and identifying data stored on the magnetic stripe of a purchase card.

19. The vending machine as recited in claim 16 wherein said means for connecting a portable digital media player device to said vending machine comprises a hardware docking port.

20. The vending machine as recited in claim 16 further comprising:
   means for accessing and selecting at least one of a plurality of multi-media products stored on a remote computer database.

* * * * *

UNITED STATES PATENT AND TRADEMARK OFFICE
CERTIFICATE OF CORRECTION

| | | |
|---|---|---|
| PATENT NO. | : 6,830,160 B2 | Page 1 of 1 |
| APPLICATION NO. | : 10/242641 | |
| DATED | : December 14, 2004 | |
| INVENTOR(S) | : Risolia | |

It is certified that error appears in the above-identified patent and that said Letters Patent is hereby corrected as shown below:

Column 6, lines 44-45, in Claim 17, delete "claim 16 wherein said means for accepting payment" and insert -- claim 16, further including a means for accepting payment which --.

Column 6, lines 53-54, in Claim 18, delete "claim 16 wherein said means for accepting payment" and insert -- claim 16, further including a means for accepting payment which --.

Signed and Sealed this
Fourth Day of October, 2011

David J. Kappos
*Director of the United States Patent and Trademark Office*